United States Patent [19]

Petri

[11] Patent Number: 5,047,498

[45] Date of Patent: Sep. 10, 1991

[54] FLAME-RESISTANT POLYCARBONATE CONTAINING UNITS FROM HALOGENATED TRIPHENYL COMPOUNDS

[75] Inventor: Alberto Petri, Milan, Italy

[73] Assignee: Enichem Tecnoresine S.p.A., Palermo, Italy

[21] Appl. No.: 365,958

[22] Filed: Jun. 12, 1989

[30] Foreign Application Priority Data

Jul. 8, 1988 [IT] Italy .................................. 21283 A/88

[51] Int. Cl.$^5$ .............................................. C08G 64/14
[52] U.S. Cl. .................................... 528/202; 528/125; 528/128; 528/171; 528/174; 528/176; 528/191; 528/193; 528/203; 528/204

[58] Field of Search ............... 528/202, 204, 125, 128, 528/171, 174, 203, 176, 191, 193

[56] References Cited

U.S. PATENT DOCUMENTS 3,038,880 6/1962 Laakso et al. ........................ 528/202
3,106,544 10/1963 Laakso et al. ........................ 528/202

Primary Examiner—Harold D. Anderson

[57] ABSTRACT

Thermoplastic branched polycarbonates of high molecular weight and which possess flame-resistant (self-extinguishing) properties are provided wherein said polycarbonates contain in addition to carbonate units, units derived from a dihydroxyaromatic compound, units derived from a halogenated triphenyl compound and units derived from a polyfunctional organic branching agent.

7 Claims, No Drawings

FLAME-RESISTANT POLYCARBONATE CONTAINING UNITS FROM HALOGENATED TRIPHENYL COMPOUNDS

BACKGROUND OF THE INVENTION

This invention relates to thermoplastic branched polycarbonates of high molecular weight possessing flame-resistant properties.

Polycarbonates are known in the art for their excellent physical and mechanical properties such as their high impact strength and considerable dimensional and thermal stability.

Because of the increasing requirement for materials which for safety reasons possess not only excellent mechanical properties but also flame-resistant properties, various methods have been devised in the art for making polycarbonates self-extinguishing. One of the most commonly used methods is based on introducing halogens, mainly bromine and chlorine, into the polycarbonate. The halogens can be introduced into the polymer in the form of additives by using generally polyhalogenated organic substances such as described for example in U.S. Pat. No. 3,357,942, if desired together with other additives with synergic action, such as antimony oxide (J. T. Howarth et al., Plastic World, p. 64–74, March 1973).

It is also known to chemically bond the halogens to the polymer chain by using bifunctional phenols such as tetrabromobisphenol A and tetrachlorobisphenol A as co-monomers in the preparation of the polycarbonate (U.S. Pat. No. 3,334,154).

Halogenated substances of the known art, whether additives or monomers to incorporate in the polymer chain, must however be used in rather large quantities to give the polycarbonate the required self-extinguishing properties.

Although the presence of large halogen quantities on the one hand makes the polymer able to resist the flame, on the other hand it leads to degradation of the polycarbonate during its working, to thus cause deterioration in the inherent physical and mechanical properties of the non-halogenated polycarbonate.

Moreover, the high temperatures necessary for working the polycarbonate can cause degradation of the halogenated compounds, with release of hydrohalogen acids and consequent damage to the machines by corrosion.

Thus, the technical problem still unsolved is to produce polycarbonates possessing flame-resistant properties but which preserve all their inherent chemical, physical and mechanical properties intact.

SUMMARY OF THE INVENTION

It has now been found possible to solve said problem by preparing thermoplastic branched polycarbonates of high molecular weight possessing flame-resistant properties, by their copolymerization, in the presence of a branching agent, with a halogenated triphenyl compound used in small quantities always less than those which would result in undesirable change in the polymer properties. More specifically, according to the present invention said polycarbonates are characterised in that the macromolecule contains carbonate units, units derived from a dihydroxyaromatic compound of formula:

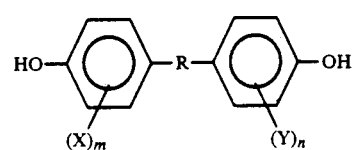

where:
R is a single bond; or a substituted or non-substituted linear or branched $C_1-C_5$ alkylene radical; or a group chosen from O, S, $SO_2$, CO;
X, Y, which can be the same or different, are H or $CH_3$;
m, n, which can be the same or different, are whole numbers from 1 to 4,
units derived from a halogenated triphenyl compound of formula:

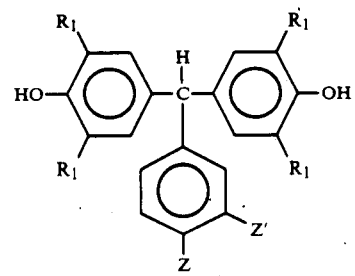

where:
$R_1$ is hydrogen or a linear or branched $C_1-C_5$ alkyl radical
Z is chlorine or bromine
Z' is hydrogen or chlorine or bromine,
and units derived from a polyfunctional organic compound acting as a branching agent.

In order for said polycarbonates to exhibit flame-resistant properties it is sufficient for the macromolecule to contain from 0.05 to 5 units derived from (II) per 100 units derived from (I), and preferably from 0.25 to 3 units.

The following are some examples of dihydroxyaromatic compounds (I) which can be used:
4,4'-dihydroxydiphenyl
2,2-bis(4-hydroxyphenyl)propane (bisphenol A)
2,2-bis(3,5-dimethyl-4-hydroxyphenyl)propane
bis(4-hydroxyphenyl)methane.

The polycarbonates of the present invention can also contain units derived from compounds with only one bivalent aromatic ring such as resorcin or hydroquinone.

The halogenated triphenyl compounds can be prepared using methods known in organic chemistry.

In particular, they can be obtained by reacting a phenol of formula:

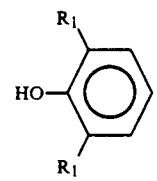

where $R_1$ has the aforesaid meaning, with an aldehyde of formula:

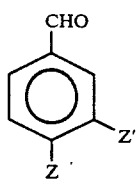

(IV)

where Z and Z' have the aforesaid meaning, using a III/IV molar ratio of at least 2/1 and preferably using a phenol quantity in excess of said ratio.

The reaction requires an acid catalyst and for this purpose hydrochloric acid gas can for example be used maintaining the reaction temperature around 20° C., or the reaction can be effected in the presence of a sulphuric acid/acetic acid mixture in a volume ratio of ½, the reaction being conducted at a temperature in the order of 5°-10° C. in a manner similar to that described in J. A. Mikroyannidis, Eur. Polym. J. 21 (10), 895 (1985).

Some examples of halogenated triphenyl compounds suitable for the purposes of the present invention are:
bis(4-hydroxyphenyl)-4'-chlorophenylmethane
bis(4-hydroxyphenyl)-3',4'-dichlorophenylmethane
bis(4-hydroxyphenyl)-4'-bromophenylmethane
bis(4-hydroxy-5-methylphenyl)-4'-chlorophenylmethane
bis(4-hydroxyphenyl)-3',4'-dibromophenylmethane.

The polyfunctional organic compounds for use as branching agents are compounds known in the art and are characterised by possessing at least three equal or different functional groups chosen from the groups: OH, COOH, COCl, SO₂Cl.

For example, the branching agents used can be the compounds described in Italian Pat. Applns. Nos. 23538 A/84 and 20927 A/87 and described in the European Pat. Applns. Publ. Nos. 0208376, 0227177, 0236592, 0254369, 0254370, 0254371, 0299545 and 0295737.

The following polyfunctional organic compounds are particularly preferred for the purposes of the present invention:
2,4,6-tris(4'-hydroxyphenyl)amino-S-triazine
3,7-dihydroxy-β-naphthoic acid
1,3,5-trihydroxybenzene
4,4'-methylenebis(3-hydroxy-2-carboxynaphthalene)
tris(4-hydroxyphenyl)methane
2,3,4,5-tetrachlorocarbonyltetrahydrofuran
1,3,6-trichlorosulphonylnaphthalenic acid.

To provide the polycarbonate with branching it is sufficient form the macromolecule to contain from 0.05 to 5 units derived from said polyfunctional organic compounds per 100 units derived from (I).

The flame-resistant polycarbonates of the present invention can be prepared by one of the polycondensation methods of the known art. For example, using the interfacial polycondensation method the aromatic dihydroxy compound (I) is dissolved in an aqueous sodium hydroxide solution, and a water-immiscible organic solvent such as methylene chloride containing both the halogenated triphenyl compound (II) and the branching agent is added to it. Phosgene gas is bubbled through the obtained mixture and the reaction is kept at a temperature of between 15° and 25° C. for a time of between 20 minutes and 6 hours, in the presence of a molecular weight regulator such as a monofunctional phenol, and a phase transfer catalyst such as a tertiary amine.

The polycarbonate obtained in this manner is isolated by washing the organic phase by known methods and distilling the solvent, or precipitating with a non-solvent.

According to a preferred form, the interfacial polycondensation reaction is conducted using, instead of phosgene, chloroformyl-terminating polycarbonate oligomers (generally of molecular weight between 400 and 2000) obtained by interfacial reaction between phosgene and a dihydroxyaromatic compound.

A further method of preparing the polycarbonates of the present invention is the known method of polycondensation in solution. In this case the phosgene is bubbled through a methylene chloride or pyridine solution containing the dihydroxyaromatic compound (I), the halogenated triphenyl compound (II), the branching agent and a monofunctional phenol as molecular weight regulator.

Said polycarbonates can also be prepared by transesterification in the molten state, by reacting the dihydroxyaromatic compound, the halogenated triphenyl compound and the branching agent with diaryl, dialkyl or alkylarylcarbonates at a temperature of between 100° and 300° C., in the presence of transesterification catalysts. The polycarbonates obtained by any one of the aforesaid methods have a prevalent molecular weight of between 20,000 and 30,000; they preserve all the inherent characteristics of thermoplastic materials and are suitable for processing either by injection moulding or by extrusion and/or blow-moulding.

Said polycarbonates can be classified as V-0 in their fire behaviour, evaluated by the UL94 code (Underwriters' Laboratories Inc., bulletin S4) and conducted on test pieces of 3.2 mm thickness prepared by compression or injection.

According to said code the materials are classified V-0, V-1 or V-2 based on the results obtained in five tests, in accordance with the following criteria:
V-0: No test piece must show a combustion time exceeding 10 seconds after removal of a bunsen flame. The total combustion time for the five test pieces (ten ignitions) must not exceed 50 seconds. No test piece must not allow burning particles to drip and ignite surgical cotton placed vertically under the test piece at a distance of 305 mm.
V-1: No test piece must show a combustion time exceeding 30 seconds after removal of a bunsen flame. The total combustion time for the five test pieces (ten ignitions) must not exceed 250 seconds. No test piece must allow burning particles to drip and ignite surgical cotton placed vertically under the test piece at a distance of 305 mm.
V-2: No test piece must show a combustion time exceeding 30 seconds after removal of a bunsen flame. The total combustion time for the five test pieces (ten ignitions) must not exceed 250 seconds. The test pieces may allow burning particles to drip and ignite surgical cotton placed vertically under the test piece at a distance of 305 mm.

In addition, all five test pieces must pass the test prescribed by UL-94 otherwise they are classified on the basis of the behaviour of the worst test piece. For example, if one test piece shows V-2 behaviour whereas the other four show V-0 behaviour, all five test pieces are classified V-2. Finally, if a test piece continues to burn for more than 30 seconds after removing the bunsen flame, it cannot be classified under UL-94 and instead is indicated as a flammable test piece.

The test pieces are also subjected to a fire-behaviour test in accordance with ASTM D 2863-77 which correlates the flammability of a polymer material with the oxygen concentration of the atmosphere in which the test piece is located. This correlation is expressed by the LOI (limiting oxygen index), i.e. the minimum oxygen percentage able to maintain combustion of the test piece in the oxygen-nitrogen atmosphere which flows about the test piece from the bottom upwards.

The following characteristics were also determined on the polycarbonates of the present invention:

Intrinsic Viscosity (n)

This property is determined in methylene chloride at 20° C. by an Ubbelhode viscometer and is expressed in dl/g.

Melt Flow Index (MFI)

The melt flow index is evaluated in a melt indexer on an extruded granulate, under a load of 1.2 kg at a temperature of 300° C., in accordance with ASTM D1238.

Impact Strength (IZOD)

This is evaluated on notched test pieces at 0° C. in accordance with ASTM D256.

Shear Sensitivity (SS)

This quantity is evaluated in a melt indexer on an extruded granulate, under loads of 1.2 and 12 kg at a temperature of 300° C., in accordance with ASTM D1238.

The following experimental examples are given for illustrative purposes only and are not to be taken as limitative of the scope of the invention.

EXAMPLE 1

Preparation of bis(4-hydroxyphenyl)-4'-chlorophenylmethane

An acetic acid solution (90 ml) containing 90.2 g (0.96 moles) of phenol and 56.2 g (0.4 moles) of p-chlorobenzaldehyde is placed in a glass reactor of 500 ml capacity fitted with a thermometer, mechanical stirrer and cooling jacket.

120 ml of a 1:2 (by volume) sulphuric acid/acetic acid mixture are dripped over a period of 1 hour into the solution, which is kept under an inert nitrogen atmosphere and temperature-controlled at 7° C.

After 24 hours of reaction the mixture is diluted with 2 litres of ethyl ether, extracted with portions of an aqueous 5% solution of $NaHCO_3$ until neutral, and then dried with $Na_2SO_4$.

The solvent is removed by atmospheric pressure distillation and the crude product obtained is dried in an oven under vacuum at 90° C. for 4 hours.

The obtained crude product is firstly crystallized in 600 ml of toluene, filtered off, washed with toluene and dried under vacuum in an oven at 90° C. for 4 hours.

It is then recrystallized twice in 430 ml of a 9:1 (by volume) toluene/acetic acid mixture containing 130 g of powdered zinc, by dissolving at the mixture boiling point and then slowly precipitating at 0° C.

It is then filtered off, washed with cold toluene and dried under vacuum in an oven at 90° C. for 4 hours to obtain 81.8 g of bis(4-hydroxyphenyl)-4'-chlorophenylmethane with a yield of 66%.

The product had the following characteristics:
Melting point (DSC): 129° C.

Elementary analysis: C 73.1%, H 4.9%, Cl 11.4% (experimental). C 73.4%, H 4.8%, Cl 11.3% (theoretical).

The product structure is confirmed by NMR spectroscopic analysis and mass spectrometry.

EXAMPLE 2

Preparation of bis(4-hydroxyphenyl)-3',4'-dichlorophenylmethane

The procedure of Example 1 was followed using the same method and reactant quantities, but using 3,4-dicyclochlorobenzaldehyde instead of p-chlorobenzaldehyde.

The purification of this product requires only one crystallization in toluene. 87.9 g of bis(4-hydroxyphenyl)-3',4'-dichlorophenylmethane are obtained with a yield of 63.7%.

The product had the following characteristics:
Melting point (DSC): 154.2° C.
Elementary analysis: C 66.1%, H 4.3%, Cl 20.8% (experimental). C 66.1%, H 4.1%, Cl 20.6% (theoretical).

The product structure is confirmed by NMR spectroscopic analysis and mass spectrometry.

EXAMPLE 3

84 g of bisphenol A, 1.37 g of bis(4-hydroxy)-4'-chlorophenyl-methane (equal to 1.2 mol % on the bisphenol A), 510 mg of 2,4,6-tris(4-hydroxyphenyl)amino-S-triazine (0.34 mol % on the bisphenol A), 65.2 g of sodium hydroxide dissolved in 650 ml of water, 20 mg of sodium dithionite (as reducing agent to prevent formation of coloured byproducts) and 6.3 ml of a 0.5N aqueous triethylamine solution are fed under a nitrogen stream into a 3 liter glass reactor temperature-controlled at 25° C.

1.7 g of p-tert.butylphenol dissolved in 1300 ml of methylene chloride are then added and 44 g of phosgene gas are bubbled over a time of 30 minutes through the mixture, which is subjected to vigorous stirring.

The reaction proceeds for 2 hours, aqueous sodium hydroxide (20 wt %) being added up to keep the pH continuously greater than 11. The mixture is then diluted with 500 ml of methylene chloride and the organic phase is separated and washed successively with 300 ml of water (twice), 800 ml of 0.1N hydrochloric acid and finally with 600 ml portions of water until neutral.

The polymer is recovered by distillation, and is dried and ground to obtain a powder.

The polycarbonate obtained in this manner is then extruded at 260° C. and the extrusion cooled and granulated.

The granules are moulded either by compression (280° C., 50 kg/cm$^2$) or by injection (300° C.) to obtain test pieces of size 127×6.5×3.2 mm.

Five test pieces are subjected to the fire behaviour test described in UL 94. They are found to be V-0, in accordance with the data given in Table 1.

The other polycarbonate characteristics are given in Table 2.

EXAMPLE 4

Example 3 is repeated using the same operating method and reactant quantities, except that 1.4 g of bis(4-hydroxy)-3',4'-dichlorophenylmethane (1.1 mol % on the bisphenol A) are used instead of the bis(4-hydroxy)-4'-chlorophenyl-methane.

The polycarbonate obtained is found to be V-0 in accordance with UL 94, the test data being given in Table 1.

The other polymer characteristics are given in Table 2.

EXAMPLE 5

Example 3 is repeated using the same operating method and reactant quantities, except that no halogenated triphenyl compound is used. The polycarbonate obtained is found to be V-2 in accordance with UL 94 (see Table 1).

The other polymer characteristics are given in Table 2.

EXAMPLE 6

253.8 g polycarbonate chloroformyl-terminating oligomers (average molecular weight 681, chloroformyl terminal groups=2758 meq/kg, hydroxyl terminal groups=180 meq/kg) prepared from bisphenol A and phosgene and dissolved in 900 ml of methylene chloride are fed under nitrogen into a glass reactor of 2.5 liters capacity temperature-controlled at 25° C.

There are then added, in the stated order, 50 ml of water containing 5.94 g of bis(4-hydroxy)-4'-chlorophenylmethane (equal to 1.64 mol % on the bisphenol A), 1.71 g of 2,4,6-tris(4'-hydroxyphenyl)amino-S-triazine (equal to 0.36 mol % on the bisphenol A), 5.3 g of p-tert.butylphenol, 5.0 g of caustic soda, 31 mg of sodium dithionite and 7 ml of a 0.05N aqueous solution of triethylamine under mechanical stirring with a double anchor device (300 r.p.m.).

After 40 minutes, 350 ml of water containing 64.4 g of bisphenol A and 20.5 g of caustic soda are added, followed by the addition over a period of 10 minutes of 115 ml of an aqueous 20 wt % caustic soda solution using a metering pump.

After 140 minutes the mixture is poured into 3000 ml of methylene chloride; the organic phase is then separated and washed, in the stated order, with 450 ml of water (twice), 1300 ml of 0.15N aqueous sodium hydroxide (3 times), 900 ml of water (twice) and 1300 ml of 0.1N hydrochloric acid, and finally with 900 ml portions of water until neutral.

The polymer is recovered by distilling the organic solvent, and is dried and ground to obtain a powder.

The polycarbonate obtained in this manner is then extruded at 260° C. and the extrusion cooled and granulated.

The granules are moulded by injection or compression to obtain test pieces of size 127×6.5×3.2 mm.

Five test pieces are subjected to the fire behaviour test described in UL 94 and are found to be V-0, in accordance with the data given in Table 1.

The other polycarbonate characteristics are given in Table 2.

EXAMPLE 7

Example 6 is repeated using the same operating method and reactant quantities, except that 3.9 g of bis(4-hydroxy)-4'-chlorophenyl-methane (1.08 mol % on the bisphenol A) are added.

The polycarbonate obtained is found to be V-0 at the fire behaviour test in accordance with UL 94. (See Table 1).

The other polymer characteristics are given in Table 2.

EXAMPLE 8

Example 6 is repeated using the same operating method and reactant quantities, except that 4.4 g of bis(4-hydroxyphenyl)-3',4'-dichlorophenylmethane (1.08 mol % on the bisphenol A) are added instead of the bis(4-hidroxyphenyl)-4'-chlorophenyl-methane.

The polycarbonate obtained is found to be V-0 at the fire behaviour test in accordance with UL 94 (see Table 1).

The other polymer characteristics are given in Table 2.

EXAMPLE 9

Example 6 is repeated using the same operating method and reactant quantities, except that no halogenated triphenyl compound is added.

The polycarbonate obtained is found to be V-2 at the fire behaviour test in accordance with UL 94 (Table 1).

The other polymer characteristics are given in Table 2.

TABLE 1

| Ex. | Total combustion time of 5 test pieces (10 ignitions) (seconds) | Maximum combustion time per test piece (2 ignitions) (seconds) | Classification UL-94 |
| --- | --- | --- | --- |
| 3 | 33 | 8 | V-0 |
| 4 | 42 | 10 | V-0 |
| 5 | 106 | 24 | V-2 |
| 6 | 32 | 8 | V-0 |
| 7 | 42 | 10 | V-0 |
| 8 | 47 | 10 | V-0 |
| 9 | 99 | 23 | V-2 |

TABLE 2

| Ex. | [n] 20° C. CH$_2$Cl$_2$ (dl/g) | LOI % | Impact (IZOD) (J/m) | MFI (300° C.; 1.2 kg) | SS (300° C.; 1.2 & 12 kg) |
| --- | --- | --- | --- | --- | --- |
| 3 | 0.554 | 34 | 791 | 4.9 | 21.0 |
| 4 | 0.538 | 33 | 772 | 7.5 | 20.8 |
| 5 | 0.542 | 26 | 760 | 7.6 | 22.5 |
| 6 | 0.595 | 33 | 706 | 4.4 | 23.3 |
| 7 | 0.583 | 36 | 740 | 3.7 | 24.2 |
| 8 | 0.563 | 30 | 705 | 6.7 | 23.6 |
| 9 | 0.571 | 28 | 780 | 6.0 | 23.0 |

I claim:

1. A thermoplastic branched polycarbonate of high molecular weight possessing flame-resistant properties, wherein said polycarbonate contains carbonate units, units derived from a dihydroxyaromatic compound of formula:

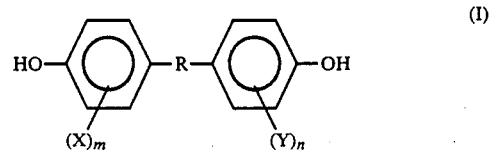

wherein:
R a substituted or non-substituted linear or branched C$_1$-C$_5$ alkylene radical, or a group chosen from O, S, SO$_2$, or CO; or R is a single bond;
X and Y, are the same or different and are H or CH$_3$;
m and n are the same or different and are whole numbers from 1 to 4,
units derived from a halogenated triphenyl compound of the formula:

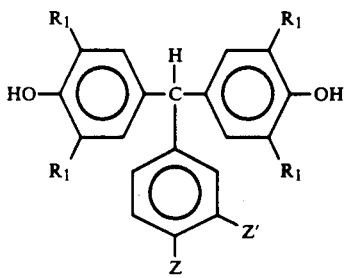

(II)

where:

$R_1$ is hydrogen or a linear or branched $C_1$–$C_5$ alkyl radical;

Z is chlorine or bromine; and

Z' is hydrogen chlorine or bromine, and units derived from a polyfunctional organic branching agent, and processing at least three equal or different functional groups chose from OH, COOH, COCl, or $SO_2Cl$ groups.

2. The polycarbonate of claim 1, wherein said polycarbonate contains from 0.05 to 5 units derived from (II) per 100 units derived from (I).

3. The polycarbonate of claim 2, wherein said polycarbonate contains from 0.25 to 3 units derived from (II) per 100 units derived from (I).

4. The polycarbonate of claim 1, wherein said dihydroxyaromatic compound (I) is chosen from:
4,4'-dihydroxydiphenyl,
2,2-bis(4-hydroxyphenyl)propane,
2,2-bis(3,5-dimethyl-4-hydroxyphenyl)propane or
bis(4-hydroxyphenyl)methane.

5. The polycarbonate of claim 1, wherein said halogenated triphenyl compound (II) is chosen from:
bis(4-hydroxyphenyl)-4'-chlorophenylmethane,
bis(4-hydroxyphenyl)-3',4'-dichlorophenylmethane,
bis(4-hydroxyphenyl)-4'-bromophenylmethane,
bis(4-hydroxyphenyl-3',4'-dibromophenylmethane, or
bis(4-hydroxy-5-methylphenyl)-4'-chlorophenylmethane.

6. The polycarbonate of claim 1, wherein said polycarbonate contains from 0.05 to 5 units derived from said branching agent per 100 units derived from (I).

7. The polycarbonate of claim 1, wherein said branching agent is chosen from:
2,4,6-tris(4'hydroxyphenyl)amino-S-triazine,
3,7-dihydroxy-B-naphthoic acid,
1,3,5-trihydroxybenzene,
4,4'-methylenebis(3-hydroxy-2-carboxynaphthalene),
tris(4-hydroxyphenyl)methane,
2,3,4,5-tetrachlorocarbonyltetrahydrofuran, or
1,3,6-trichlorosulphonylnaphthalenic acid.

* * * * *